Aug. 19, 1969   H. REBER   3,462,303
HERMETICALLY SEALED STORAGE BATTERY INCLUDING
AN AUXILIARY ELECTRODE
Filed Oct. 23, 1967

INVENTOR
Harald REBER
By

Michael J. Striker
his ATTORNEY

United States Patent Office 3,462,303
Patented Aug. 19, 1969

3,462,303
HERMETICALLY SEALED STORAGE BATTERY
INCLUDING AN AUXILIARY ELECTRODE
Harald Reber, Stuttgart-Feuerbach, Germany, assignor to
Robert Bosch G.m.b.H., Stuttgart, Germany
Filed Oct. 23, 1967, Ser. No. 677,178
Claims priority, application Germany, Oct. 28, 1966,
B 89,602
Int. Cl. H01m 35/00, 13/00
U.S. Cl. 136—3                      15 Claims

ABSTRACT OF THE DISCLOSURE

A hermetically sealed storage battery, preferably a lead-acid battery, in which oxygen gas is developed upon super-charging which oxygen gas collects in a gas space within the sealed housing of the storage battery, and including an auxiliary electrode at least partially located in the gas space and in contact with the liquid electrolyte, the auxiliary electrode forming with the negative electrode of the battery a voltage differential, the value of which changes with changes in the partial oxygen gas pressure in the gas space; and a control device for terminating a charging current when the partial oxygen gas pressure and thus the voltage differential reaches a predetermined value; the auxiliary electrode including as active constituent the combination of an organic redox system with an electrically conductive material which is inert with respect to the liquid electrolyte, such as graphite.

Background of the invention

The invention is concerned with a hermetically sealed storage battery including an auxiliary electrode for controlling the charge condition of the battery, particularly for preventing excessive super-charging.

It is known to provide hermetically sealed storage batteries with negative electrodes including an excess of uncharged negative active mass, and to have part of the surface of the negative electrode extend into the gas space of the battery.

It is achieved thereby that upon charging of the battery the development of oxygen gas will precede the development of hydrogen gas. When charging the battery with a low current it can furthermore be accomplished that the oxygen gas formed in the battery will react with the active mass of the negative electrode so that excess over-pressure will not be formed in the sealed battery and no hydrogen gas will be developed at the negative electrode.

Such arrangements may be used in alkaline as well as in acidic storage batteries and may be further improved by other measures which will serve to prevent hydrogen gas development upon super-charging.

However, hermetically sealed batteries utilizing the above described devices have certain disadvantages which include the following:

(1) The charging current must be so maintained that upon completed charging no harmful over-pressure will be formed within the sealed battery. Since the reaction of gaseous oxygen with the negative active mass is a relatively slow process which furthermore creates heat, it is necessary to operate with relatively long charging periods and quick charging is not possible, even in the case of relatively small batteries. Due to the increase in charging current with increasing size of the battery, there exists an upper limit for the size of the hermetically sealed storage battery since very large batteries would be excessively heated even with normal charging currents, at least upon super-charging.

(2) In the case of open batteries, in which hydrogen gas development would be permissible, the great voltage increase which occurs upon completion of charging of the battery is frequently utilized for limiting the charging, i.e., for terminating the charging current, particularly upon quick charging of the battery.

In the conventional hermetically sealed batteries in which hydrogen gas development must be carefully avoided, only a very slight increase in the battery voltage will occur upon completion of charging, which increase is too small to permit its utilization for termination of the charging current with conventional control devices.

However, since upon completion of charging of the hermetically sealed battery the partial oxygen gas pressure in the battery rises substantially, it is desirable to utilize an auxiliary electrode which with increasing partial oxygen gas pressure will cause a significant voltage change against the negative electrode or plates of the battery.

Such auxiliary batteries, for instance of the type which has been developed in connection with fuel cells, usually include metallic catalysts which sreve to assure the specific activity of the auxiliary electrode with respect to oxygen. These metallic catalysts are only in very rare cases compatible with the battery system in which they are to operate.

The only combination which will not cause any difficulties is the utilization of a silver-activated auxiliary oxygen electrode in an alkaline silver-zinc battery. However, particularly for use in hermetically sealed storage batteries which include an acidic electrolyte, no suitable oxygen electrodes, apart from those which use platinum metals for activation, are available.

It has been proposed to use mercury as the active constituent of an oxygen auxiliary or control electrode, however, this suggestion appears to be without practical significance since mercury, due to its liquid state, can only be used with great difficulties in the production of the electrode.

Summary of the invention

According to the present invention a hermetically sealed storage battery in which oxygen gas is developed upon super-charging will include in the sealed housing, in addition to electrodes of opposite polarity and a liquid electrolyte (which may be an acidic electrolyte) an auxiliary electrode in contact with the gas space and the liquid electrolyte, which auxiliary electrode will form with the negative electrode of the battery a voltage differential the value of which will be dependent on the partial oxygen gas pressure in the gas space of the sealed battery. Thus, when upon super-charging of the battery the partial oxygen gas pressure in the gas space will rise, a change in the voltage differential will occur and this change may be utilized for actuating control devices for terminating the charging current. The auxiliary electrode of the battery according to the present invention is a porous electrode which includes as active constituent an organic redox system having admixed thereto electrically conductive material which is inert with respect to the battery system, particularly the liquid electrolyte and which may consist, for instance, of graphite. The organic redox system may be a high polymeric condensation product of an aldehyde and an aromatic polyfunctional phenol, or a metal-containing organic dye complex, particularly a metal-containing phthalocyanine or porphyrine dye.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Description of the preferred embodiments

Figure 1:
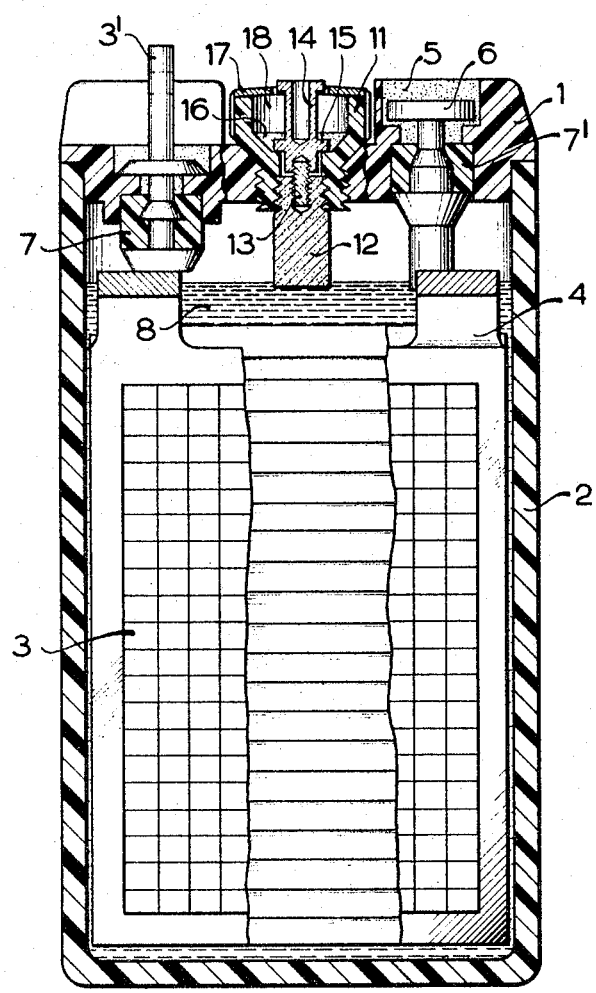
FIG. 1 is an elevational view partly in cross-section of a hermetically sealed battery in accordance with the present invention.

The present invention is concerned with providing a hermetically sealed storage battery in which oxygen gas will develop and must be consumed under certain operating conditions, for instance super-charging, with an auxiliary electrode which will be sufficiently sensitive to exposure to varying partial pressures of oxygen gas, which electrode is inert with respect to the battery system and particularly possesses sufficient stability against attack by the electrolyte.

Such an auxiliary electrode will contain, according to the present invention, as the active component an organic redox system, preferably in the form of a high polymeric material, or as organic catalyst, which is of porous structure and includes an addition of electrically conductive material, preferably a carbonaceous material for instance graphite.

Particularly two groups of redox systems have been found to be eminently suitable for the purpose of the present invention, inert with respect to the various components of the battery and stable in the liquid electrolyte.

The first of these groups encompasses organic redox systems which in their reduced form will be oxidized by gaseous oxygen and the oxidized form of which may be electrochemically reduced. Such materials are particularly stable in acidic and basic electrolytes, if they are present in highly polymerized form. The electric conductivity of the electrodes which is required for the electrochemical reduction may be obtained by incorporation of conductive carbon or graphite in the, in most cases, thermoplastic, active, organic material. The porosity of the electrode will serve to make the same permeable for gaseous oxygen.

Excellently suitable auxiliary electrodes according to the present invention may be obtained by utilization of formaldehyde-hydroquinone condensation resins. The oxidation and reduction of these resins may be exemplified by the redox reaction of their monomers 1. 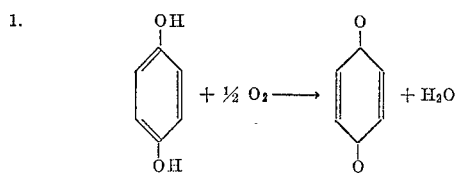

oxidation of hydroquinone by means of oxygen to quinone

2. 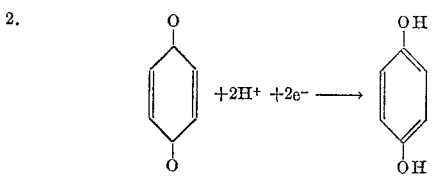

electrochemical reduction of quinone to hydroquinone

The monomers are not suitable for the purpose of the present invention due to their solubility and instability in the electrolyte. However, the polymeric condensation resins thereof possess the desired high degree of stability and the desired redox characteristics.

Chemically, these polymers correspond about to the following structural formulae:

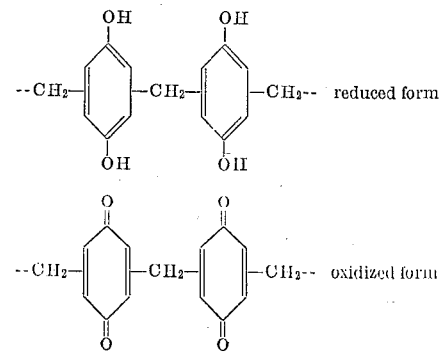

To produce the auxiliary electrode from these starting materials, one may proceed as follows:

6 g. acetylene black and 2 g. of graphite powder are intimately mixed to form a first mixture. A second mixture is formed of 6 g. hydroquinone, 3 g. phenol, 3 g. p-phenol sulfonic acid and 6 ml. water.

The thus obtained first and second mixtures are then intimately mixed in a kneading device and 10 ml. of a 35% formalin solution are added to form a third mixture.

10 ml. benzine and 1 g. of finely subdivided pyrogenic silica, for instance the product commercially available under the tradename "Aerosil," are mixed to form a fourth mixture and the thus obtained fourth mixture is then mixed in the kneader with mixture three, which had been previously obtained therein.

In this manner, a well kneaded paste is obtained which is introduced into a metal mold having a diameter of 30 mm. and a height of 5 mm. The paste filling the mold is then put under slight pressure by superposition of a suitable piston. Hardening of the mass is carried out for 20 hours at 80° C., thereafter the piston is removed and hardening is continued at atmospheric presure at 230° C. for a period of between 2 and 4 hours. In this manner a very strong and stable electrode having a porosity of about 60% by volume is obtained. The thus obtained electrode is soaked for a prolonged period of time in 40% aqueous sulfuric acid in order to dissolve any acid-soluble constituents thereof, thereafter washed with water until free of acid, and dried at 80° C.

The thus obtained auxiliary electrode is introduced into a hermetically sealed lead battery for instance a lead acid storage battery which upon super-charging produces oxygen gas. The pores of the electrode may be only partly filled with electrolyte in order to allow access of the oxygen gas collecting in the gas space to the active material of the electrode. For instance, the auxiliary electrode may be incorporated in a storage battery as described in my copending application Ser. No. 531,930, the contents of which are included herein by reference.

The battery, for instance, may correspond to that illustrated in FIG. 1.

Referring now to the drawing and particularly to FIG. 1, the hermetically sealed lead acid battery comprises a cover 1 hermetically closing container 2. Cover 1 and container 2 consist of thermoplastic synthetic material and are fluid-tightly interconnected by means of a solvent applied to the contacting faces of cover 1 and container 2 and capable of making the same adhesive. Upon evaporation of the solvent a fluid-tight bond is thus obtained between cover 1 and container 2. In the thus hermetically sealed container will be found negative plates 3 and 3', and positive plates 4. A conductive connecting member 6 associated with positive plates 4 is covered with insulating mass 5. Rubber sleeves 7 and 7' serve for hermetically sealing the interior of the battery against the lead-ins.

The intervening spaces between electrode plates 3, 3' and 4 are filled with an acidic electrolyte 8. Cylindrical auxiliary electrode 12 extends downwardly into electrolyte 8. Auxiliary electrode 12 is inserted into a stopper 11 of synthetic material which is screwed into cover 1, and is connected by threaded bolt 13 with contact 14 into which an electric cable (not shown) may be inserted. Contact member 14 is supported by annular flange 15 on a recess of the wall of stopper 11 which is covered by cover 17 to define a space 18 which is filled with a casting resin to assure hermetic sealing.

Figure 2:
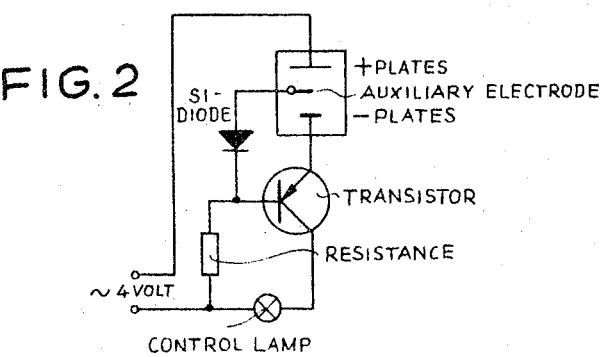
FIG. 2 is a schematic illustration of an embodiment of the current control arrangement in accordance with the present invention.

The electric control arrangement associated with the auxiliary electrode is illustrated in FIG. 2 and may be associated in conventional manner with a suitable switching device for terminating the battery charging current when the voltage rises to a predetermined value.

Utilizing the above described auxiliary electrode in a lead acid battery, the following voltage differentials were determined against the negative terminal of the battery cell, depending on the partial oxygen gas pressure in the gas space of the hermetically sealed cell:

| Charge condition | Pressure in sealed cell (mm. Hg) | Voltage differential between auxiliary electrode and negative electrode at constant load of 1 ma. (mv.) |
|---|---|---|
| Empty | −28 to −40 | 100 |
| Full | ∼±0 | 400 |
| Full (super charged) | ∼100 | 860 |

If between the auxiliary electrode and the negative terminal of the cell a constant voltage differential of 100 mv. is maintained at which voltage differential the electrode operated in the liminal current area, the following current values are obtained:

Mm. Hg                        Ma.
−28 to −40 ------------------------------ 1
∼ ± 0 ------------------------------ 4
100 ------------------------------ 10

The term "liminal current area" is meant to denote the portion of the current-voltage characteristics of the electrode in which the current due to diffusion inhibition reaches a liminal maximum value.

With these variations in current and voltage between the negative terminal of the storage battery or cell and the auxiliary electrode, it is possible to actuate control devices which, for instance, adjust the charging or supercharging current so that a constant partial oxygen gas pressure is maintained in the cell. Particularly when operating in the liminal current area of the electrode, the current flow in the electrode circuit is closely correlated to the partial oxygen gas pressure in the cell and thus obviously also to the charge condition of the cell.

External charging current control devices may be effectively simplified with increasing sensitivity of the auxiliary electrode relative to the partial oxygen gas pressure, i.e., with increasing change in current or voltage by exposure of the auxiliary electrode to a given differential of oxygen gas pressures. This sensitivity, or the activity of the auxiliary electrode can be substantially increased if in place of the redox system hydroquinone-quinone, redox systems of greater reaction speed are utilized. On the basis of formaldehydephenol condensation resins, it is possible to incorporate a great number of other organic redox systems in a high polymer skeleton. Particularly good voltage differences are obtained for instance by replacing hydroquinone with pp′-diphenol or oo′-diphenol. A high reactivity is obtained by condensing phenolic derivatives of naphthaline, anthracene or anthroquinone as phenolic component with formaldehyde. It is also within the scope of the present invention to replace formaldehyde with other aldehydes such as benzaldehyde or salicyclaldehyde.

A second group of organic redox systems for oxygen gas activation of the auxiliary electrode consists, according to the present invention, of organic vat dyes which may be oxidized with oxygen to form the dye stuff and which then may again be electrochemically reduced.

Some of these dye stuffs which are known per se, for instance some of the triphenylmethane and phthaleine series may be condensed with aldehydes to form resinous products which maintain the redox characteristics of the initial dye stuffs. Furthermore, it is also possible to bind dye stuffs, particularly those which are salts, on ion exchange resins, especially in ionized form of the dye salts and thereby to make these dye salts resistant to acid and alkali.

In this connection, i.e., in an attempt to find particularly stable organic dye stuff molecules which would be suitable for utilization in the auxiliary electrode according to the present invention, further organic compounds were made available. These are organic metal complex compounds which, surprisingly, have been found to be capable of forming an oxygen activatable redox system.

The activity of metal phthalocyanine complexes in cold sulfuric acid, for instance in the electrolyte of a lead acid battery, by far exceeded all expectations. It is therefore reasonable to assume that these compounds are true catalysts. The metals which are contained in the phthalocyanine complexes are so firmly bound to the organic molecule that the otherwise harmful influence of the metals on the functioning of the battery will be nullified.

For instance, if cobalt is introduced as metallic electrode into a hermetically sealed lead battery operating according to the oxygen cycle, certain disadvantages result. Hydrogen gas is developed and will make the battery useless within a short period of time. However, in contrast thereto, cobalt-phthalocyanine is completely inert within the battery. The activity of phthalocyanine-activated electrodes is many times greater than that of the resinous electrodes described further above. Thus, for instance, with electrodes of this type, a current of more than 100 ma. per $cm.^2$ of electrode surface could be obtained in the liminal current area in cold sulfuric acid.

An auxiliary electrode including cobalt-phthalocyanine as the active constituent may be produced in the following manner:

1 g. cobalt-phthalocyanine is dissolved in 50 ml. concentrated sulfuric acid. The thus obtained solution is used for impregnating porous filtering charcoal having a pore volume of between 40 and 50% and a mean pore radius of 60 microns. The thus impregnated charcoal is placed on water-moistened felt or another sponge-like acid resistant material so that due to slow equalization the acid concentration in the interior of the pores of the charcoal is slowly reduced. Thereby, the cobalt-phthalocyanine will be precipitated in the pores of the charcoal in finely subdivided form. After about 10 hours, the charcoal disc is placed into water and thereafter washed until free of acid and then dried. The thus treated charcoal disc or the like is now ready to be incorporated as auxiliary oxygen electrode into a hermetically sealed storage battery cell which operates in accordance with the oxygen cycle.

The current values obtained with comparable voltage differentials and partial oxygen gas pressures with a thus produced electrode are between about 5 and 10 times higher than the values which are obtained with the hydroquinone redox electrodes described further above.

Optimum effectiveness of the auxiliary electrode is obtained if by suitable arrangements in the control circuit outside the battery the current flowing between the negative terminal of the battery and the auxiliary electrode at voltage differentials <400 mv. will be prevented to become greater than 1 ma. This may be accomplished, for instance, by interposing an Si-diode, in the circuit arrangement between the auxiliary electrode and conventional external electric control means such as a relay arrangement or transistor control arrangement so that current will flow from the electode through the diode to the external control arrangements.

It is assured thereby that even if the gas space in the hermetically sealed cell is completely free of oxygen, for instance in discharged condition of the cell, no hydrogen gas will be developed at the auxiliary electrode.

It will be understood that each of the elements described above, or two or more together, may also find a useful application in other types of hermetically sealed storage batteries differing from the type described above.

While the invention has been illustrated and described as embodied in a hermetically sealed lead acid storage battery provided with an auxiliary oxygen electrode. It is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A hermetically sealed storage battery in which oxygen gas is developed upon super-charging, comprising, in combination, a sealed housing; electrodes of opposite polarity and a liquid electrolyte located in said housing filling the same but partly so as to define a gas space within said housing; an auxiliary electrode located at least partly in said gas space, spaced from said electrodes and in contact with said liquid electrolyte, said auxiliary electrode being capable of forming with the electrode of negative polarity of said battery a voltage differential the value of which changes with changes in the partial oxygen gas pressure in said gas space; and control means responsive to said voltage differential for terminating charging of said battery when the partial oxygen gas pressure in said gas space reaches a predetermined value, said auxiliary electrode including as active constituent an organic redox system and an electrically conductive material which is inert with respect to said electrolyte.

2. A hermetically sealed storage battery as defined in claim 1, wherein said auxiliary electrode is of porous structure and said organic redox system is a high polymeric material.

3. A hermetically sealed storage battery as defined in claim 2, wherein said electrolyte is an acidic electrolyte.

4. A hermetically sealed storage battery as defined in claim 3, and being a lead acid battery.

5. A hermetically sealed storage battery as defined in claim 2, wherein said organic redox system is a condensation product of an aldehyde and an aromatic polyfunctional phenol.

6. A hermetically sealed storage battery as defined in claim 5, wherein said aldehyde is selected from the group consisting of formaldehyde and benzaldehyde, and said phenol is a diphenol.

7. A hermetically sealed storage battery as defined in claim 2, wherein said organic redox system is a condensation product of an aldehyde and an organic dye.

8. A hermetically sealed storage battery as defined in claim 2, wherein said organic redox system is a resinous condensation product of an aldehyde, an organic dye and a phenol.

9. A hermetically sealed storage battery as defined in claim 8, wherein said aldehyde is selected from the group consisting of formaldehyde and benzaldehyde.

10. A hermetically sealed storage battery as defined in claim 2, wherein said active constituent of said auxiliary electrode is an organic redox salt absorbed by an organic ion exchange resin.

11. A hermetically sealed storage battery as defined in claim 2, wherein said electrically conductive material is a carbonaceous material.

12. A hermetically sealed storage battery as defined in claim 11, wherein said carbonaceous material is graphite.

13. A hermetically sealed storage battery as defined in claim 2, wherein said active constituent of said organic redox system consists essentially of a metal-containing organic dye complex.

14. A hermetically sealed storage battery as defined in claim 13, wherein said metal-containing organic dye complex is a member of the group consisting of phthalocyanine and porphyrine dyes.

15. A hermetically sealed storage battery as defined in claim 1, wherein said control means include switching means for switching off of a charge current when said voltage differential reaches a predetermined value, and a Si-diode interposed between and electrically connected to said auxiliary electrode and said switching means.

References Cited

UNITED STATES PATENTS

| | | | |
|---|---|---|---|
| 3,005,943 | 10/1961 | Jaffe | 136—13 |
| 3,080,440 | 3/1963 | Ruetschi et al. | 136—3 |
| 3,124,488 | 3/1964 | Ruetschi | 136—178 |
| 3,185,590 | 5/1965 | Mayer et al. | 136—6 |

WINSTON A. DOUGLAS, Primary Examiner

D. L. WALTON, Assistant Examiner

U.S. Cl. X.R.

136—6, 179